ously defined and $R$ is a monovalent

United States Patent Office 3,453,306
Patented July 1, 1969

3,453,306
PROCESS FOR PREPARING SILOXANES
Terry G. Selin, Schenectady, N.Y., assignor to General Electric Company, a corporation of New York
No Drawing. Filed Dec. 19, 1966, Ser. No. 602,532
Int. Cl. C07f 7/08
U.S. Cl. 260—448.2
6 Claims

ABSTRACT OF THE DISCLOSURE

Acyloxy containing siloxanes of known utility are prepared by the following reaction:

$$\equiv SiOM + \equiv SiOY \rightarrow \equiv SiOSi \equiv + MOY$$

where M is Li, Na, or K, and Y is an acyloxy radical of 1 to 8 carbon atoms.

---

This invention relates to a process for forming siloxanes and, in particular, to a process for forming siloxanes which are difficult to prepare by conventional techniques. These silanes include siloxanes in which the silicon atoms have various monovalent hydrocarbon substituents and siloxanes in which the siloxane units, in addition, contain acyloxy substituents.

Although many processes have been available for forming various types of siloxanes, including acyloxysiloxanes, such processes have had limited flexibility in regard to the variety of products obtained therewith. For example, acyloxysilanes, which are known to be useful in the formation of compositions which are convertible to the solid, cured, elastic state at room temperature upon exposure to atmospheric moisture, can be prepared only in a limited variety. The process of the present invention provides a means for preparing a wide variety of known siloxanes and acyloxysiloxanes and a number of interesting new materials.

It is an object of the present invention, therefore, to provide a process for forming siloxanes, including acyloxysiloxanes.

Additional objects of this invention will be apparent from the following description.

In accordance with the present invention, a new silicon-oxygen-silicon linkage is prepared by contacting a first organosilicon compound having a silicon-bonded-OM group with a second organosilicon compound having a silicon-bonded acyloxy radical, where M is a member selected from the class consisting of lithium, sodium, and potassium, where said first organosilicon compound is either a silane, an organopolysiloxane, or a disilane, and where said second organosilicon compound is also either a silane, an organopolysiloxane, or a disilane, where the valences of said silanes and disilanes not satisfied by silicon-bonded-OM radicals, silicon-bonded acyloxy radicals or silicon-silicon linkages are satisfied by monovalent hydrocarbon radicals and where the organo groups of said organopolysiloxanes other than the acyloxy groups are monovalent hydrocarbon radicals. By contacting said first organosilicon compound with the silicon-bonded-OM group with the second organosilicon compound with a silicon-bonded acyloxy radical, a new siloxane linkage is formed between a silicon atom of said first organosilicon compound containing the silicon-bonded —OM group and a silicon atom of said second organosilicon compound containing a silicon-bonded acyloxy group. The formation of the new siloxane linkage is accompanied by the formation of a salt of the acyloxy radical.

The general reaction involved in the process of the present invention is represented by the following equation:

(1) $\equiv SiOY + MOSi\equiv \rightarrow \equiv SiOSi\equiv + MOY$ where Y represents an acyl group, such as an acetyl group.

The organosilicon compounds containing silicon-bonded —OM groups are either silanolates or siloxanolates, or disilanolates.

The silanolates employed in the present invention have the formula:

(2) $(MO)_m(R)_{4-n}Si$ where M is as previously defined and R is a monovalent hydrocarbon radical, and $n$ is an integer equal to from 1 to 2, inclusive. The siloxanolates employed in the present invention have the formula:

(3) $(MO)_a(R)_bSiO_{\frac{4-a-b}{2}}$ where M and R are as previously defined, $a$ has a value of from 0.005 to 1, inclusive, $b$ has a value of from 2.000 to 2.5, inclusive, and the sum of $a$ plus $b$ is equal to from 2.01 to 3, inclusive.

The disilanolates employed in the present invention have the formula:

(4) $(MO)_c(R)_{3-c}SiSi(R)_{3-d}(OM)_d$ where M and R are as previously defined, and $c$ and $d$ are both whole numbers equal to from 0 to 1, inclusive, and the sum of $c$ plus $d$ is an integer equal to from 1 to 2, inclusive.

Illustrative of the monovalent hydrocarbon radicals represented by R in Formula 2 are, for example, alkyl radicals, e.g., methyl, ethyl, propyl, butyl, octyl, octadecyl, etc. radicals; aryl radicals, e.g., phenyl, naphthyl, tolyl, xylyl, etc. radicals; aralkyl radicals, e.g., benzyl, phenylethyl, etc. radicals; alkenyl radicals, e.g., vinyl, allyl, etc. radicals; cycloaliphatic hydrocarbon radicals, e.g., cyclohexyl, cycloheptyl, cyclohexenyl, etc. radicals. Also included within the scope of the monovalent hydrocarbon radicals are substituted monovalent hydrocarbon radicals in which the substituents are inert under the reaction conditions of the present invention, including, for example, halogenated monovalent hydrocarbon radicals, such as chlorophenyl, dibromophenyl, trifluoromethylphenyl, chloromethyl, chloroethyl, dibromoethyl, trifluoromethylethyl, etc. radicals; cyanoalkyl radicals, such as beta-cyanoethyl, gamma-cyanoethyl, etc. radicals, as well as other substituted radicals, such as p-nitrophenyl, p-cyanophenyl, etc. radicals. Preferably, the radicals represented by R are methyl and phenyl, with the preferred specific radical being the methyl radical.

From the description of the silanolates within the scope of Formula 2, it is seen that these silanolates can contain one or two silicon-bonded —OM radicals per silicon atom. Typical of such silanolates are, for example, sodium trimethylsilanolate, potassium trimethylsilanolate, lithium trimethylsilanolate, sodium triphenylsilanolate, lithium triethylsilanolate, dilithium diphenylsilanediolate, disodium dimethylsilanediolate, etc.

The siloxanolates within the scope of Formula 3 include a great many materials which vary from disiloxanes through polysiloxanes containing up to about 200 silicon atoms per molecule. These siloxanolates include both linear and branched-chain materials which can contain various types of siloxane units, including diorganosiloxane units, triorganosiloxane units, and monoorganosiloxane units, as well as siloxane units which contain one or more —OM radicals, so long as the proportions of the various types of siloxane units are selected so as to be within the scope of Formula 3. A particularly useful class of starting siloxanolates are the disiloxanolates in which one or both of the silicon atoms contains a silicon-bonded —OM radical. Typical disiloxanolates of this type include sodium-1,1,1-trimethyl-3,3-diphenyldisiloxane-3-olate;
lithium-1,1,1,3-tetramethyl-3-beta-cyanoethyldisiloxane-3-olate;
patassium-1,1,1,3-tetramethyl-3-vinyldisiloxane-3-olate;
dilithium-1,1,3,3-tetramethyldisiloxane-1,3-diolate, etc.

The disilanolates employed in the present invention include materials such as lithium pentamethyldisilanolate, disodium - 1,1,2,2 - tetramethyldisilane - 1,2 - diolate, dipotassium - 1,1,2,2 - tetraphenyldisilane - 1,2 - diolate, etc.

Many of the organosilicon compounds containing —OM radicals employed in the present invention are known in the art and many others are described in my copending applications Ser. No. 602,541, Ser. No. 602,519, Ser. No. 602,490, Ser. No. 602,478, and Ser. No. 602,562, all of the aforementioned applications being filed concurrently herewith and assigned to the same assignee as the present invention.

The acyloxy organosilicon compounds employed in the process of the present invention include acyloxysilanes having the formula:

(5)  $(YO)_m(R')_{4-m}Si$ acyloxysiloxanes having the formula:

(6) 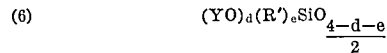 $(YO)_d(R')_e SiO_{\frac{4-d-e}{2}}$ and acyloxydisilanes having the formula:

(7) 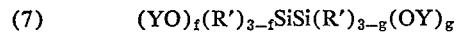 $(YO)_f(R')_{3-f}SiSi(R')_{3-g}(OY)_g$ where Y is an acyl radical of an aliphatic monovalent carboxylic acid containing from 1 to 8 carbon atoms, R' is a monovalent hydrocarbon radical of the same scope previously defined for R, m is a whole number equal to from 1 to 4, inclusive, d has a value of from 0.005 to 1, inclusive, e has a value of from 2.000 to 2.5, inclusive, and the sum of d plus e is equal to from 2.01 to 3, inclusive; f is a whole number equal to from 0 to 3, inclusive, g is a whole number equal to from 0 to 3, inclusive, and the sum of f plus g is equal to from 1 to 6, inclusive. Included among the acyl radicals represented by Y of Formulas 5, 6, and 7, are, for example, formyl, acetyl, propionyl 2-ethylhexoyl, etc. radicals.

As is apparent from the description of Formulas 5, 6, and 7, the organosilicon compounds containing silicon-bonded acyloxy radicals are substantially identical to the organosilicon compounds containing silicon-bonded —OM radicals, except that instead of the presence of —OM radicals, OY radicals are substituted. Thus, typical silanes within the scope of Formula 5 include triphenyl-acetoxysilane, dimethyldiacetoxysilane, dibutyldipropionoxysilane, tetraacetoxysilane, etc. The siloxanes within the scope of Formula 6, again include simple disiloxanes, such as pentamethylacetoxydisiloxane, simple trisiloxanes, such as heptaphenylformoxytrisiloxane, as well as longer chain siloxanes containing up to about 200 silicon atoms per molecule. In addition to the simple siloxane compounds within the scope of Formula 6 are siloxanes in which more than one radical is represented by the various R' groups. For example, an acyloxysiloxane within the scope of Formula 6 is 1,1,1-trimethyl-3,3-diphenyl-3-acetoxydisiloxane. Within the scope of the disilanes of Formula 7 are the materials comparable to those of the disilanolates within the scope of Formula 4. A typical compound within the scope of Formula 7 is, for example, pentamethyl-acetoxydisilane. As with the organosilicon compounds containing the —OM radicals, the organosilicon compounds containing silicon-bonded acyloxy radicals have their valences preferably satisfied by methyl or phenyl radicals, but the preferred radical is again the methyl radical.

The acyloxysilanes, siloxanes and disilanes employed in the practice of the present invention are known in the art. Some of such acyloxysilanes are those unsymmetrical siloxanes, such as 1,1,1,4-tetraacetoxyhexamethyltetra-siloxane, which are described in the copending application of Frederick M. Lewis, Ser. No. 508,381, filed Nov. 17, 1965, and assigned to the same assignee as the present invention. This application is hereby incorporated by reference into the present application for a description of such acyloxypolysiloxanes.

As shown by Formula 1, the reaction of the present invention involves a silicon-bonded —OM group and a silicon-bonded acyloxy group. The result of the reaction is to join the first molecule to the second molecule through a newly formed siloxane linkage. If each of the organosilicon compounds involved in the reaction contain only one group which can react, the result is a simple coupling reaction. For example, when sodium triphenyl silanolate is reacted with trimethylacetoxysilane, the resulting material is 1,1,1-triphenyl-3,3,3-trimethyldisiloxane. On the other hand, where one or both of the reactants contains more than one of the reactive groups, the products become more complicated. For example, when two moles of sodium triphenyl silanolate is reacted with one mole of dimethyldiacetoxysilane, the resulting product is a trisiloxane in which the two end silicon atoms each contains three silicon-bonded phenyl groups and in which the middle silicon atom contains two silicon-bonded methyl groups. When disodium diphenylsilane diolate is reacted with 1,1,3,3-tetramethyl-1,3-diacetoxydisiloxane, the reaction can involve many molecules of each starting material so that a possible product can include a linear siloxane containing recurring units consisting of one diphenylsiloxane unit and two dimethylsiloxane units. Alternately, these same reactants in the same equimolar proportions and under the proper reaction conditions can lead to the poduction of cyclotrisiloxanes containing one diphenylsiloxane unit and two dimethylsiloxane units per molecule.

In addition to reactions involving all of the silicon-bonded —OM radicals of one reactant and all of the acyloxy radicals of another reactant, the process of the present invention can also involve only some of such reactive groups. For example, when one mole of sodium trimethyl silanolate is reacted with one mole of tetra-acetoxysilane, the resulting product is the disiloxane in which one silicon atom contains three silicon-bonded methyl groups and the other contains three silicon-bonded acetoxy groups. This product can then be reacted further with some additional material, such as, for example, one mole of lithium triphenyl silanolate, to produce a trisiloxane in which one terminal silicon atom contains three trimethylsiloxane units, the other contains three phenyl groups, and in which the middle silicon atom contains two acetoxy radicals.

The foregoing description of the type of reactions involved in the present invention illustrates the fact that the molar proportions of the two different types of reactants employed in the process of the present invention can vary widely, depending on desired results. However, in general, the reactants are selected in such proportions that there is one silicon-bonded —OM group for each acyloxy group to be reacted. Since the reaction is essentially quantitative when these proportions of ingredients are employed, there is no specific benefit for employing a different ratio of ingredients. However, where it is important to be especially certain that no silicon-bonded acyloxy radicals remain in the acyloxysilane, siloxane or disilane, it is sometimes beneficial to employ a relative molar excess of the silanolate or siloxanolate. Where fewer than all of the silicon-bonded acyloxy groups of the acyloxy compound are to be reacted, it is understood that the molar proportions of ingredients are adjusted accordingly. When an excess of the silanolate or siloxanolate is employed to insure reaction of all of the silicon-bonded acyloxy radicals, the excess can amount to form 10 to 50 percent or more.

Since the silanolates and siloxanolates or disilanolates employed in the practice of the present invention are generally solid materials, it is preferred to conduct the reaction between the organosilicon compound containing the —OM radicals and the acyloxy compound in the presence of a suitable solvent or a mixture of such solvents. Any solvent which will dissolve the reactants is satisfactory, with the preferred solvents being hydrocarbons, such as hexane, octane, benzene, toluene, xylene, and with other oxygenated solvents also being satisfactory, including ethers, such as diethyl ether and tetrahydrofuran, and amines, such as pyridine, as well as amides, such as dimethylformamide, and nitriles, such as acetonitrile and benzonitrile.

In carrying out the reaction, the reactants are dissolved in the solvent generally employing from about 1 to 100 parts solvent per part by weight of the other components of the reaction mixture. The reaction is effected by slowly mixing the reactants, generally in any desired order, and maintaining the reaction mixture at the reaction temperature for a sufficient time to complete the reaction. In general, reaction temperatures range from room temperature up to about 100° C. or more, with the reaction times running from a few minutes to a few hours, depending upon reaction conditions. In most cases, however, the reaction is substantially completed as soon as mixing of the reactants is completed. In one particular case, the method of adding the two reactants to the reaction mixture is important. This is the case in which it is desired to replace fewer than all of the silicon-bonded acyloxy radicals with siloxane linkages. Thus, for example, in the reaction between equimolar amounts of sodium trimethyl silanolate and tetraacetoxysilane, it is important to add the sodium trimethyl silanolate to a solution of the tetraacetoxysilane so as to insure that only one acetoxy radical per molecule is replaced.

After the reaction is completed, the products of the reaction include the desired coupling product, as well as any unreacted starting materials, and as well as the lithium, sodium, or potassium salt which is a product of the reaction. Generally, all components of the reaction mixture, except the salt, will be in solution. Therefore, the salt is filtered from the reaction mixture and the solvent is stripped from the filtrate to produce the desired product or the desired product together with unreacted starting materials. Where the unreacted starting materials include a silanolate or siloxanolate or an organosilicon compound containing an —OM radical, washing the reaction mixture with water will convert the compound containing the —OM group to the corresponding silanol and the resulting material can be purified. In some cases, fractional distillation is used to isolate the desired product. In any event the desired product can be obtained by one of the usual techniques which are obvious to a person skilled in the art.

The invention is illustrated, rather than limited, by the following examples. All parts are by weight unless indicated otherwise.

EXAMPLE 1

Sodium trimethylsilanolate was reacted with methyltriacetoxysilane to form a product comprising tris-(trimethylsiloxy) methylsilane as the principal component:

$3NaOSi(CH_3)_3 + (AcO)_3SiCH_3 \rightarrow [(H_3C)_3SiO]_3SiCH_3 + 3NaOAc$ wherein Ac = 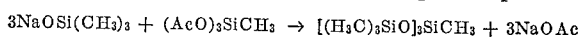

In a flask equipped with magnetic stirrer, thermometer, reflux condenser with drying tube, and addition funnel were placed 100 ml. of dry hexane and 11 g. (0.05 mole) of $(AcO)_3SiCH_3$. To the resulting mixture were added 22.4 g. (0.2 mole) of $NaOSi(CH_3)_3$ as a solution in 50 ml. of dry hexane. The addition was accomplished in a dropwise fashion giving rise to an exothermic reaction, the temperature ranging from 25° C. to 60° C., and the formation of solid sodium acetate. Following the addition of the silanolate the mixture which formed was stirred for an additional 30 minutes, then treated with 1% aqueous HCl. A clear hexane layer was isolated and washed once with 1% HCl, then twice with distilled water. After drying the hexane solution over $Na_2SO_4$, the hexane was evaporated, leaving a clear, colorless fluid which was shown to be primarily tris-(trimethylsiloxy) methylsilane by comparison of VPC and infrared data with that of the known material.

EXAMPLE 2

1,1,2 - tris(trimethylsiloxy)-1,2,2-trimethyldisilane was prepared by reaction of sodium trimethylsilanolate with 1,1,2-triacetoxy-1,2,2-trimethyldisilane, as represented below:

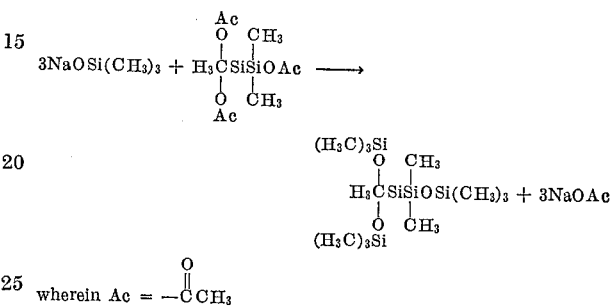

wherein Ac = $-\overset{O}{\underset{\|}{C}}CH_3$

In the same apparatus described in Example 1, 33 g. (0.12 mole) of 1,1,2-triacetoxy-1,2,2-trimethyldisilane were dissolved in 100 ml. of dry hexane. By means of an addition funnel, 56 g. (0.5 mole) of $NaOSi(CH_3)_3$ in 200 ml. of hexane were added dropwise over a period of one hour. Again, the reaction was strongly exothermic, temperature 25–65° C., and was accompanied by the formation of solid sodium acetate. The resulting reaction mixture was washed twice with 1% HCl, then twice with water. Vapor phase chromatographic (VPC) analysis indicated the crude product contained a major component whose retention time was greater than $[(CH_3)_3SiO]_3SiCH_3$ but less than $\{[(CH_3)_3SiO]_2SiCH_3\}_2O$. Fractional distillation yielded 17 g. of material boiling at 94–95° C./18 mm. Hg with $n_D^{25}$ 1.4129. This distilled product was pure as shown by gas chromatographic analysis. The infrared spectrum of this product was consistent with the structure 1,1,2-tris-trimethylsiloxy-1,2,2-trimethyldisilane.

EXAMPLE 3

Sodium trimethylsilanolate was reacted with tetraacetoxysilane, in a molar ratio of 2:1, to form 3,3-diacetoxyhexamethyltrisiloxane, viz:

$2NaOSi(CH_3)_3 + (AcO)_4Si \rightarrow [(H_3C)_3SiO]_2Si(OAc)_2 + 2NaOAc$ wherein Ac = 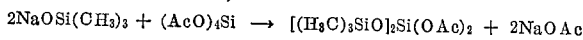

In a 1 liter, 3-necked flask (equipped as in Example 1) 50 g. (0.19 mole) of $(AcO)_4Si$ was dissolved in 500 ml. of benzene. To the solution was added a solution of 42.5 g. (0.38 mole) of $NaOSi(CH_3)_3$ in 100 ml. of dry benzene in a dropwise manner. Following the exothermic reaction, temperature 25–65° C., the resulting mixture was cooled and filtered to remove sodium acetate. The benzene was removed in a flash evaporator and the remaining material was dissolved in 200 ml. of hexane. The hexane was stripped and the stripped product was fractionally distilled. There was obtained a clear, colorless liquid which distilled at 55–60° C./0.1–0.15 mm. Hg. This product exhibited a single peak upon gas chromatographic analysis. An acetoxy analysis found 30% acetoxy groups (theo. value for 3,3-diacetoxyhexamethyltrisiloxane is 36%).

Final proof of structure for the product was obtained by converting the acetoxysiloxane to the corresponding siloxanediol. Thus, several grams of the distilled material was dissolved in ether and treated with moist $NaHCO_3$. Following the evolution of $CO_2$, the mixture was filtered to remove solids and the filtrate evaporated to dryness under a stream of air. The resulting crystalline solid was recrystallized from hexane, yielding pure $$[(CH_3)_3SiO]_2Si(OH)_2$$

melting point 96–99° C. (reference sample melted at 97–99° C.). The infrared spectrum was identical to that obtained from pure $[(CH_3)_3SiO]_2Si(OH)_2$.

EXAMPLE 4

Sodium trimethylsilanolate was also reacted with tetraacetoxysilane, in a molar ratio of 1:1, to form a composition the principal product of which is 1,1,1-triacetoxytrimethyldisiloxane:

$$NaOSi(CH_3)_3 + (AcO)_4Si \longrightarrow (AcO)_3SiOSi(CH_3)_3 + NaOAc$$

$$\text{wherein } Ac = -\overset{\overset{\displaystyle O}{\|}}{C}CH_3$$

In an apparatus similar to that in Example 3, 79.2 g. (0.3 mole) of $(AcO)_4Si$ were completely dissolved in 1000 ml. of anhydrous ether. With stirring, 33.6 g. (0.3 mole) of $NaOSi(CH_3)_3$ in 200 ml. of benzene were added dropwise to the solution. Following the addition, NaOAc was removed by filtration and the solvents were flash evaporated at 30 mm. Hg. The remaining liquid deposited some crystalline $(AcO)_4Si$ upon standing. The liquid product contained 53.4% acetoxy groups (the theo. value for $(AcO)_3SiOSi(CH_3)_3$ is 60%). An attempt was made to purify the product by distillation; but, after a mixture of $Ac_2O$ and $[(CH_3)_3SiO]_2Si(OAc)_2$ had distilled (to a pot temperature of 114° C./1.4 mm. Hg), the bulk of the material gelled rapidly with evolution of $Ac_2O$. Thus, the 1,1,1-triacetoxytrimethyldisiloxane appears to be thermally unstable. The isolation of $[(CH_3)_3SiO]_2Si(OAc)_2$ in the overhead distillate accounts for the low acetoxy analysis.

EXAMPLE 5

A dry 500 ml. flask was flushed with dry nitrogen and charged with 58.5 g. of hexamethylcyclotrisiloxane and 150 ml. of freshly distilled dry tetrahydrofuran. By means of a magnetic stirrer the mixture was stirred until complete solution resulted. The remaining steps of the reaction were also accomplished under a protective atmosphere of dry nitrogen. To the reaction solution was added 0.480 g. of lithium trimethylsilanolate. The silanolate rapidly dissolved and the resulting solution was stirred for a period of six hours at 25° C. There resulted a clear colorless solution containing a lithium polysiloxanolate of the average formula $(CH_3)_3Si[OSi(CH_3)_2]_{150}OLi$. This solution was then added to a solution of 1.32 g. of tetraacetoxysilane dissolved in 25 ml. of dry tetrahydrofuran. The mixture was stirred for one hour then partially evaporated at reduced pressure to remove all traces of the solvent. The resulting product was finally filtered through a bed of Celite to remove the lithium acetate which had formed. The final product was a clear, colorless fluid having the following average structure:

$$(CH_3)_3Si[OSi(CH_3)_2]_{150}OSi(OAc)_3$$

EXAMPLE 6

Utilizing the same technique described in Example 5, 117 g. of hexamethylcyclotrisiloxane and 0.96 g. of lithium trimethylsilanolate were allowed to react for six hours in the presence of 300 ml. of dry tetrahydrofuran. The resulting lithium polysiloxanolate solution was then added slowly to 2.20 g. of methyltriacetoxysilane dissolved in 50 ml. of dry tetrahydrofuran. After stirring the reaction mixture for one hour, the tetrahydrofuran was removed by evaporation and the product filtered to remove lithium acetate. There was obtained 115 g. of a clear, viscous fluid having the average structure:

$$(CH_3)_3Si[OSi(CH_3)_2]_{150}OSi(OAc)_2CH_3$$

While the foregoing examples have illustrated many of the embodiments of my invention, it is understood that my invention relates broadly to the reaction of a first organosilicon compound containing silicon-bonded —OM radicals and a second organosilicon compound containing silicon-bonded acyloxy radicals of the type described to form a new siloxane compound. The utility of the products formed by the process of the present invention is the same as the utility of the materials formed by alternate, but more complicated, processes. For example, the low molecular weight liquid polysiloxanes in which all of the organo groups are monovalent hydrocarbon radicals or substituted monovalent hydrocarbon radicals are useful in those applications where the thermal stability and low vapor pressure of organopolysiloxanes are needed, for example, as heat transfer fluids and as damping fluids for use in a wide temperature range. Those materials prepared by the process of the present invention which contain silicon-bonded acyloxy radicals are useful in further reactions. For example, under appropriate catalysis, organopolysiloxanes containing silicon-bonded acyloxy radicals can react with organopolysiloxanes containing silicon-bonded hydroxy groups to form more complex organosilicon materials which can be reacted and used as heat transfer agents, as antifoam materials, and the like. Those organopolysiloxanes prepared by the process of the present invention and containing acyloxy groups are also useful in the formation of room temperature curing organopolysiloxanes, since the silicon-bonded acyloxy groups will react with moisture in the atmosphere to form silanol groups which can condense to form cured products.

What I claim as new and desire to secure by Letters Patent of the United States is:

1. The process for preparing organosilicon compounds which comprises contacting a first organosilicon compound having a silicon-bonded —OM group with a second organosilicon compound having a silicon-bonded acyloxy radical, where M is a member selected from the class consisting of lithium, sodium, and potassium, and where said acyloxy radical is an acyloxy radical of an aliphatic monocarboxylic acid containing from 1 to 8 carbon atoms, where said first organosilicon compound is a member selected from the class consisting of silanes, organopolysiloxanes, and disilanes, and where said second organosilicon compound is also selected from the class consisting of silanes, organopolysiloxanes, and disilanes, where the valences of said silanes and disilanes not satisfied by silicon-bonded —OM radicals or silicon-bonded acyloxy radicals are satisfied by monovalent hydrocarbon radicals, and where the organo groups of said organopolysiloxanes other than the acyloxy radicals, are monovalent hydrocarbon radicals, whereby a new siloxane linkage is formed between a silicon atom of said first organosilicon compound containing a silicon-bonded —OM group and a silicon atom of said second organosilicon compound containing a silicon-bonded acyloxy group.

2. The process of claim 1 in which said first organosilicon compound is a silanolate having the formula:

$$(MO)_n(R)_{4-n}Si$$

where M is a member selected from the class consisting of lithium, sodium, and potassium, R is a monovalent hydrocarbon radical, and $n$ is a whole number equal to from 1 to 2, inclusive.

3. The process of claim 1 in which said first organosilicon compound is an organopolysiloxanolate having the formula:

$$(MO)_a(R)_bSiO_{\frac{4-a-b}{2}}$$

where M is a member selected from the class consisting of lithium, sodium, and potassium, R is a monovalent hydrocarbon radical, $a$ has a value of from 0.005 to 1, inclusive, $b$ has a value of from 2.00 to 2.5, inclusive, and the sum of $a$ plus $b$ is equal to from 2.01 to 3, inclusive.

4. The process of claim 1 in which said second organosilicon compound is a silane having the formula:

$$(YO)_m(R')_{4-m}Si$$

where Y is an acyl radical of an aliphtic monocarboxylic acid having from 1 to 8 carbon atoms, R' is a monovalent hydrocarbon radical, and m has a value of from 1 to 4, inclusive.

5. The process of claim 1 in which said second organosilicon compound is an organopolysiloxane having the formula:

$$(YO)_d(R')_e SiO_{\frac{4-d-e}{2}}$$

where Y is an acyl radical of an aliphatic monocarboxylic acid containing from 1 to 8 carbon atoms, R' is a monovalent hydrocarbon radical, d has a value of from 0.005 to 1, inclusive, e has a value of from 2.000 to 2.5, inclusive, and the sum of d plus e is equal to from 2.0 to 3.

6. The process of claim 1 in which said second organosilicon compound is a disilane having the formula:

$$(YO)_f(R')_{3-f}SiSi(R')_{3-g}(OY)_g$$

where Y is an acyl radical of an aliphatic monocarboxylic acid having from 1 to 8 carbon atoms, R' is a monovalent hydrocarbon radical, f is a whole number from 0 to 3, inclusive, g is a whole number from 0 to 3, inclusive, and the sum of f plus g is equal to from 1 to 6, inclusive.

References Cited
UNITED STATES PATENTS 3,337,497    8/1967    Bostick _____ 260—448.2 X TOBIAS E. LEVOW, *Primary Examiner.*

P. F. SHAVER, *Assistant Examiner.*

U.S. Cl. X.R.

260—46.5, 398